United States Patent
Mathur et al.

(10) Patent No.: US 12,481,184 B2
(45) Date of Patent: Nov. 25, 2025

(54) EYEWEAR WITH NON-POLARIZING AMBIENT LIGHT DIMMING

(71) Applicants: Vaibhav Mathur, Playa Vista, CA (US); Miller Schuck, Erie, CO (US); Mario Matranga, Chandler, AZ (US)

(72) Inventors: Vaibhav Mathur, Playa Vista, CA (US); Miller Schuck, Erie, CO (US); Mario Matranga, Chandler, AZ (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/870,985

(22) Filed: Jul. 22, 2022

(65) Prior Publication Data
US 2024/0027804 A1    Jan. 25, 2024

(51) Int. Cl.
*G02F 1/133* (2006.01)
*G02B 27/01* (2006.01)
(Continued)

(52) U.S. Cl.
CPC ..... *G02F 1/13312* (2021.01); *G02B 27/0172* (2013.01); *G02F 1/13725* (2013.01); *G02F 1/13737* (2013.01); *G09G 3/001* (2013.01); *G09G 3/36* (2013.01); *G02B 2027/0118* (2013.01); *G02B 2027/0178* (2013.01); *G02F 1/13712* (2021.01); *G02F 1/1396* (2013.01); *G02F 2203/48* (2013.01); *G09G 2320/0686* (2013.01); *G09G 2360/144* (2013.01)

(58) Field of Classification Search
CPC ............. G02F 1/13312; G02F 1/13725; G02F 1/13737; G02F 1/13712; G02F 1/1396; G02F 2203/48; G02B 27/0172; G02B 2027/0118; G02B 2027/0178; G09G 3/001; G09G 3/36; G09G 2320/0686; G09G 2360/144
See application file for complete search history.

(56) References Cited

U.S. PATENT DOCUMENTS 9,087,471 B2    7/2015 Miao
2013/0286053 A1*  10/2013 Fleck ................... G09G 3/3208
                                                   345/82

(Continued)

OTHER PUBLICATIONS

International Search Report and Written Opinion for International Application No. PCT/US2023/028167, dated Nov. 13, 2023 (Nov. 13, 20223—9 pages.

*Primary Examiner* — Dmitriy Bolotin
(74) *Attorney, Agent, or Firm* — CM Law; Stephen J. Weed

(57) ABSTRACT

An electronic eyewear device including a spatial dimming pixel panel within an optical assembly that delivers improved backlighting conditions for displayed images. The spatial dimming pixel panel is spatially dimmed where an image is positioned on a display, and the unoccupied area of the display is not dimmed (undimmed), thereby unaltering the real-world view through that portion of the display. The spatial dimming pixel panel is made of multiple liquid crystal cells arranged in a gridded orientation with a dye-doped or guest-host liquid crystal system having a phase change mode with homeotropic alignment. The spatial dimming pixel panel absorbs nonpolarized light when a voltage is applied across the cells and passes nonpolarized light in the absence of a voltage across the cells.

18 Claims, 16 Drawing Sheets

(51) Int. Cl.
*G02F 1/137* (2006.01)
*G09G 3/00* (2006.01)
*G09G 3/36* (2006.01)
*G02F 1/139* (2006.01)

(56) References Cited

U.S. PATENT DOCUMENTS

| | | | |
|---|---|---|---|
| 2013/0314454 A1* | 11/2013 | Jin | G09G 3/30 |
| | | | 345/84 |
| 2015/0355521 A1* | 12/2015 | Alton | G02B 27/0101 |
| | | | 250/214 AL |
| 2015/0370071 A1* | 12/2015 | Alton | G02F 1/1313 |
| | | | 359/275 |
| 2018/0286324 A1* | 10/2018 | Chen | G02F 1/13306 |
| 2019/0295503 A1 | 9/2019 | Ouderkirk et al. | |
| 2019/0392746 A1 | 12/2019 | Bohn | |
| 2020/0018962 A1* | 1/2020 | Lu | G02F 1/133 |
| 2020/0074724 A1* | 3/2020 | Mathur | G02B 27/0172 |
| 2020/0111258 A1 | 4/2020 | Sears et al. | |
| 2021/0003872 A1* | 1/2021 | Russell | G02C 7/101 |
| 2021/0048676 A1* | 2/2021 | Manly | G02B 27/281 |
| 2021/0141229 A1* | 5/2021 | Mathur | G02F 1/1368 |

* cited by examiner

EYEWEAR WITH NON-POLARIZING AMBIENT LIGHT DIMMING

TECHNICAL FIELD

The present subject matter relates to an electronic eyewear device, e.g., smart glasses having cameras and see-through displays.

BACKGROUND

Electronic eyewear devices, such as smart glasses, headwear, and headgear available today integrate cameras, see-through displays, and antennas. The eyewear may be used in a variety of lighting environments that may interfere with the performance of the see-through displays.

BRIEF DESCRIPTION OF THE DRAWINGS

The drawing figures depict one or more implementations, by way of example only, not by way of limitations. In the figures, like reference numerals refer to the same or similar elements.

Features of the various implementations disclosed will be readily understood from the following detailed description, in which reference is made to the appended drawing figures. A reference numeral is used with each element in the description and throughout the several views of the drawing. When a plurality of similar elements is present, a single reference numeral may be assigned to like elements, with an added letter referring to a specific element.

Figure 1A:
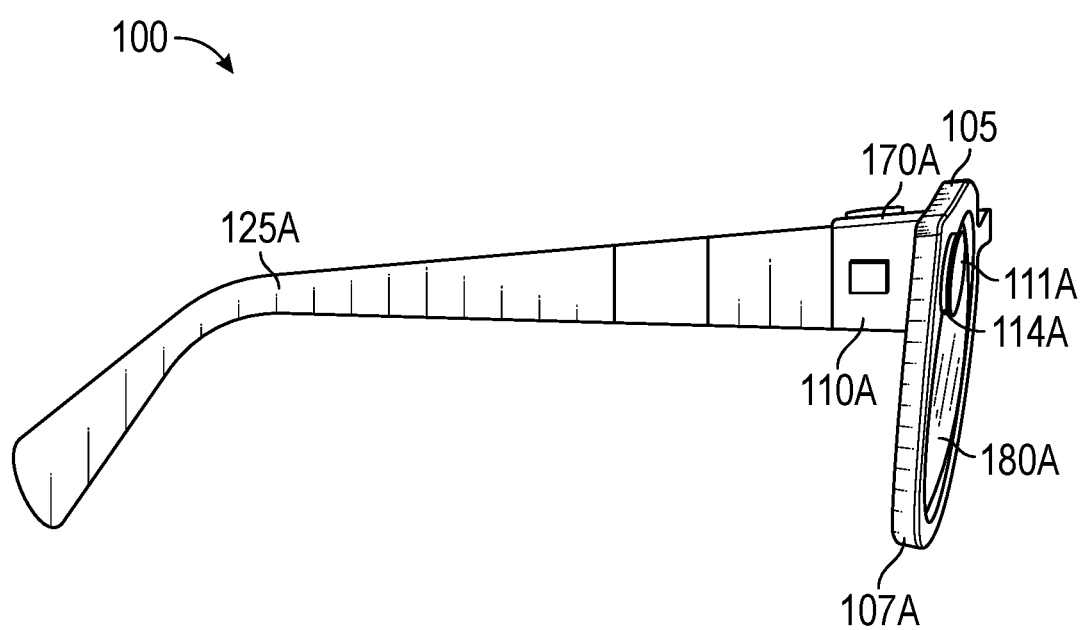
Figure 1B:
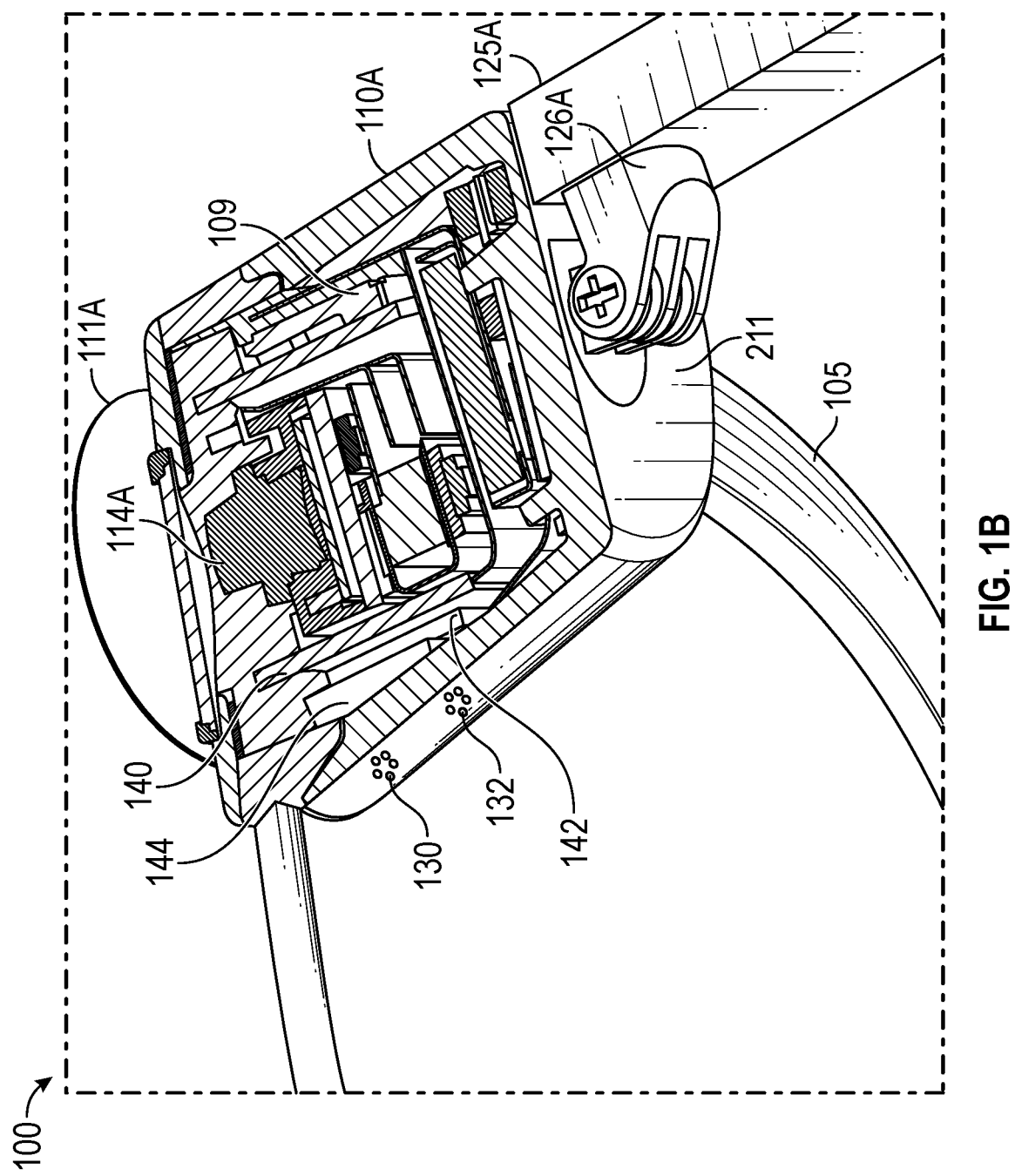
Figure 2A:
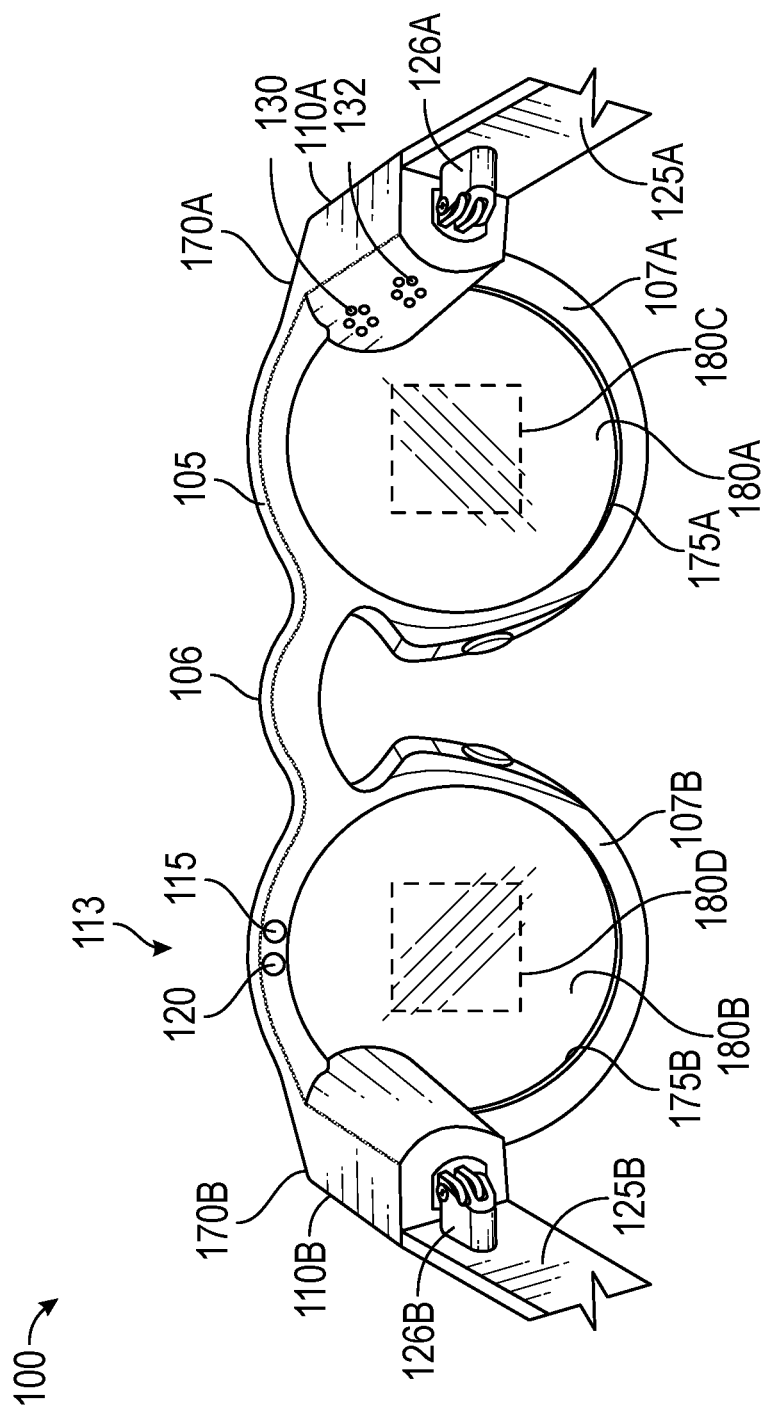
Figure 2B:
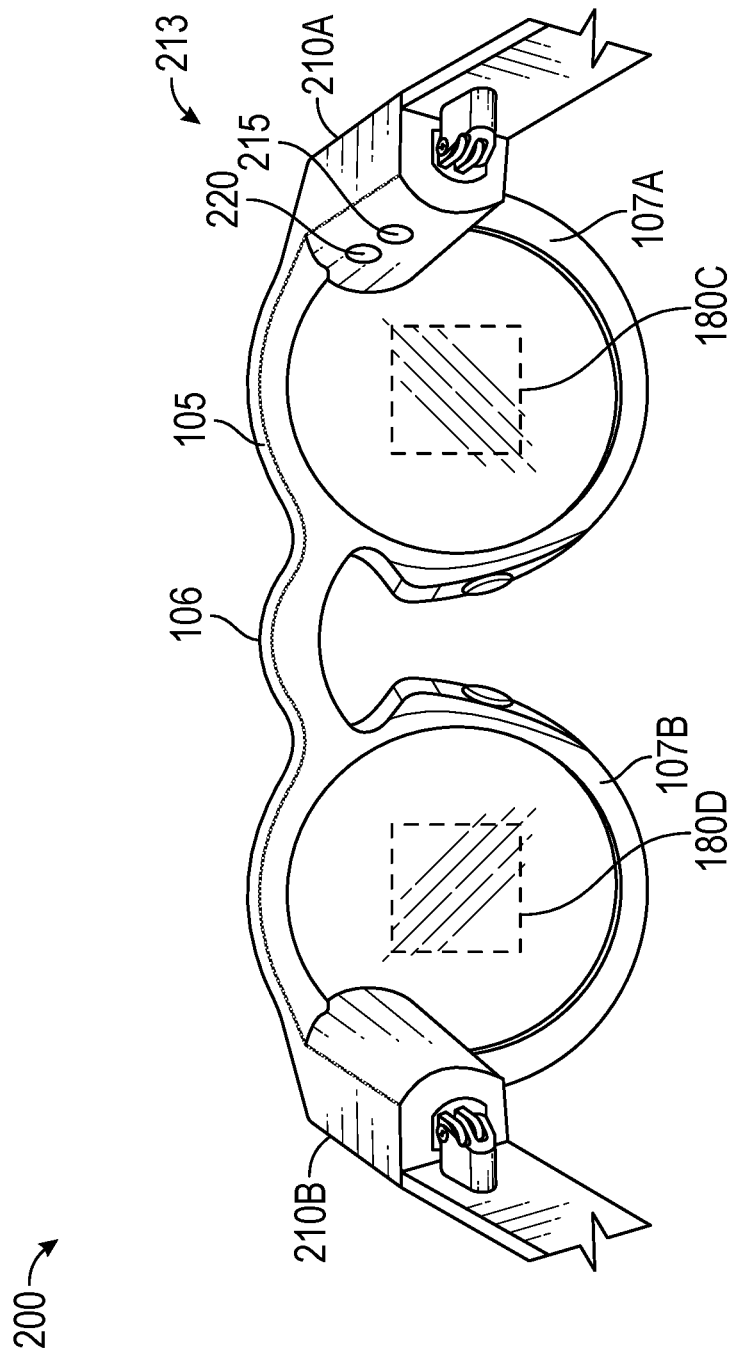
Figure 2C:
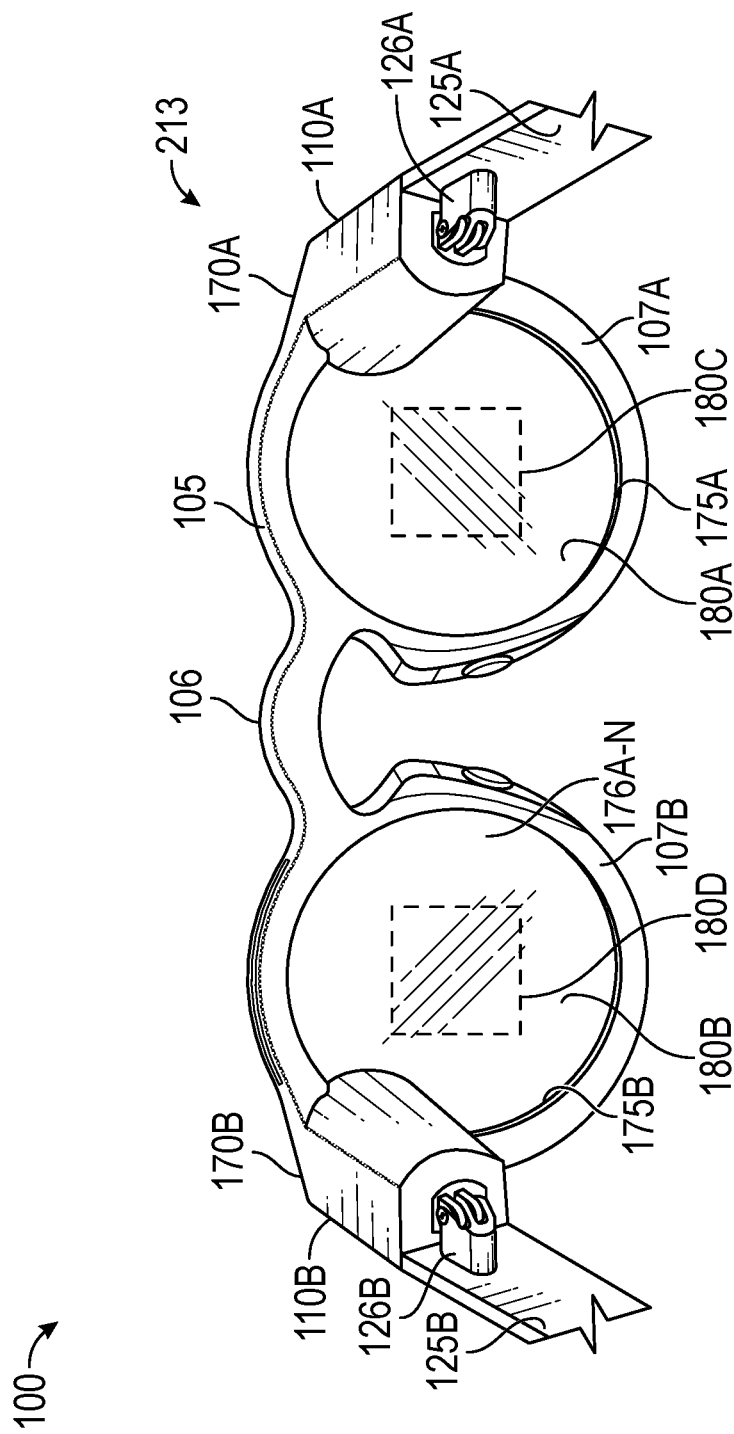
Figure 2D:
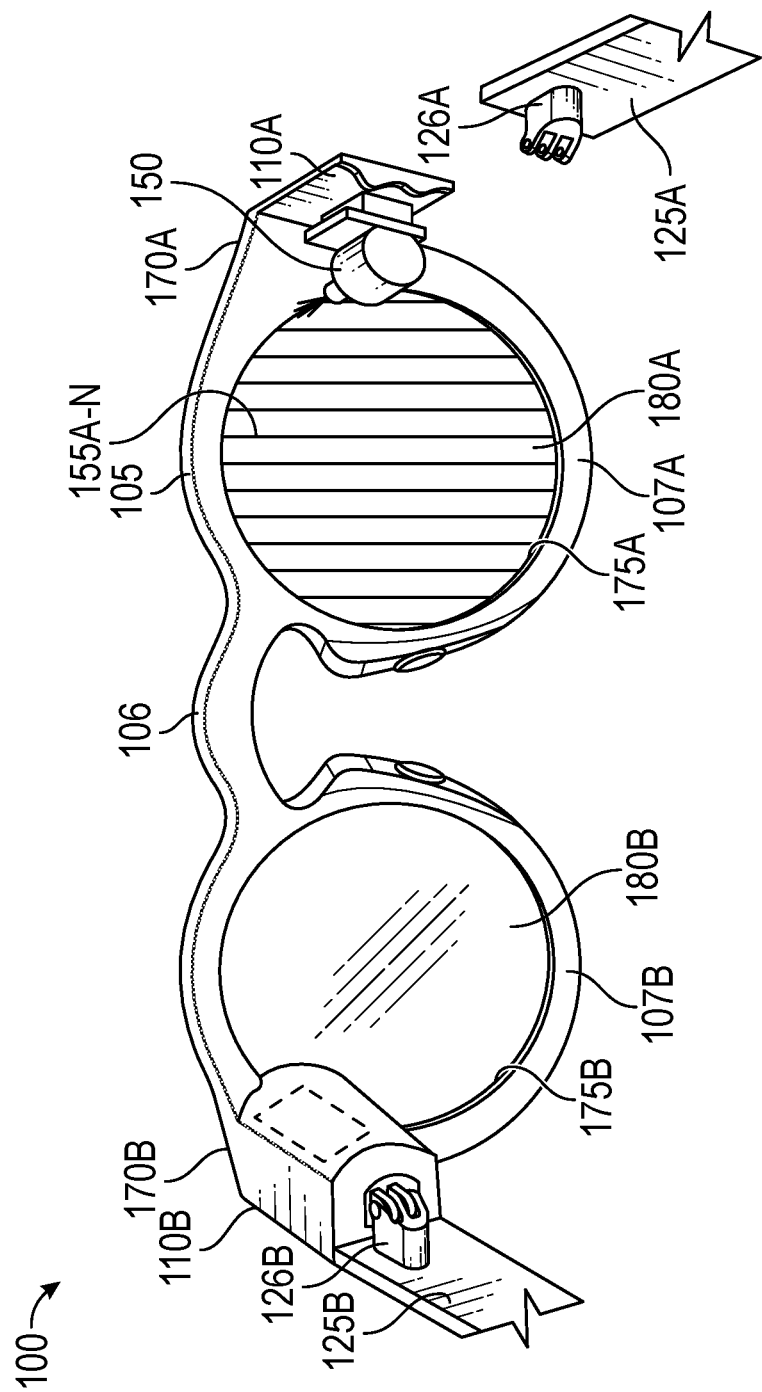
Figure 3:
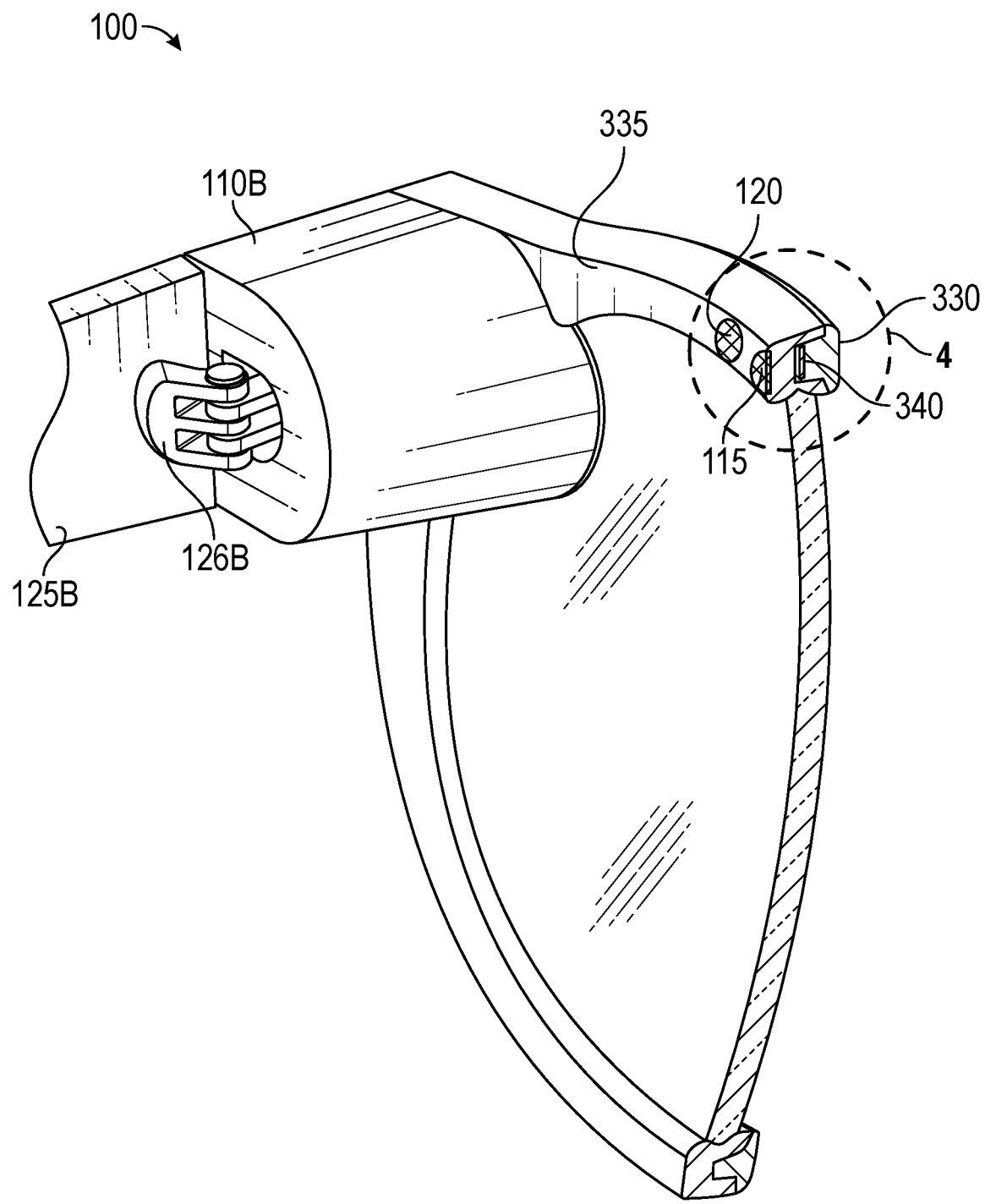
Figure 4:
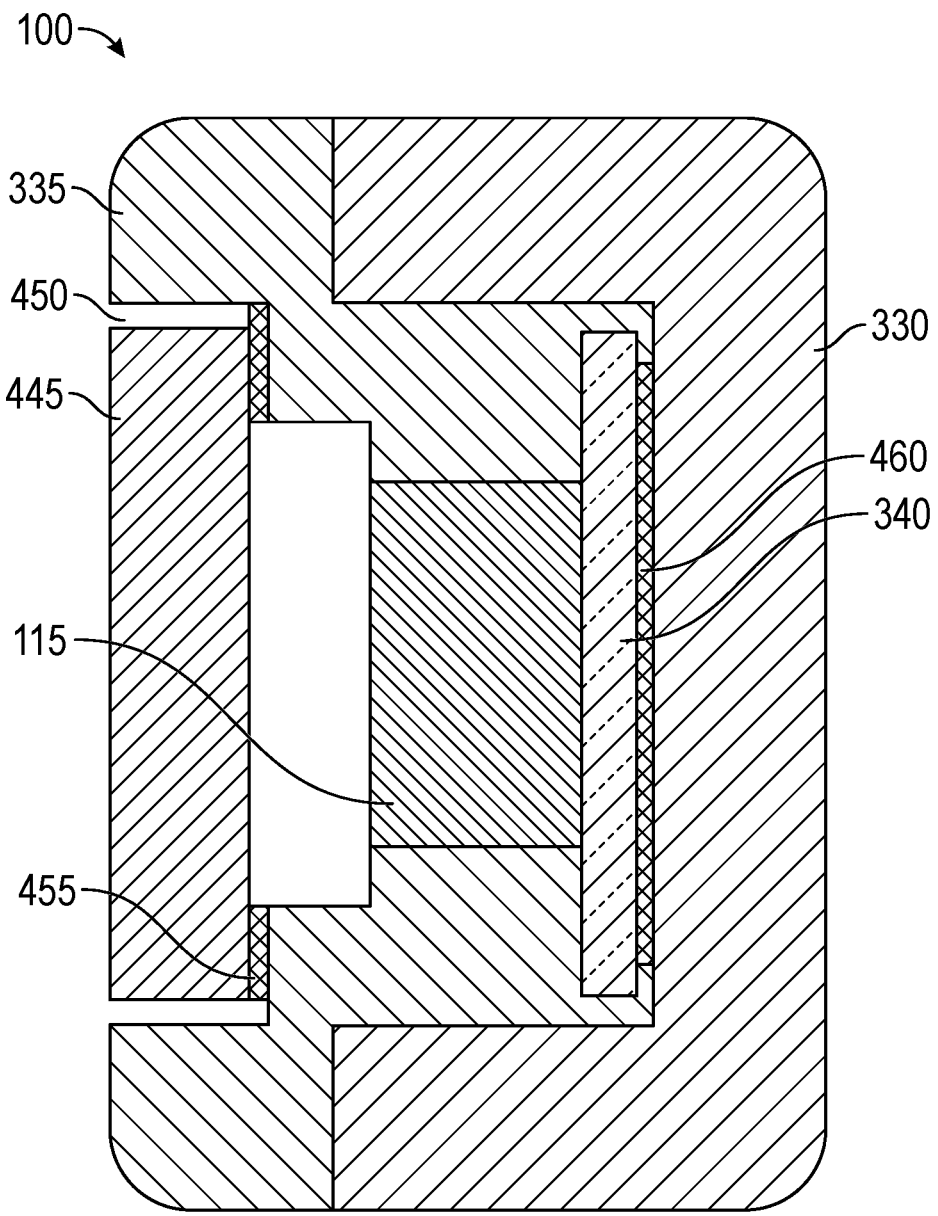
Figure 5:
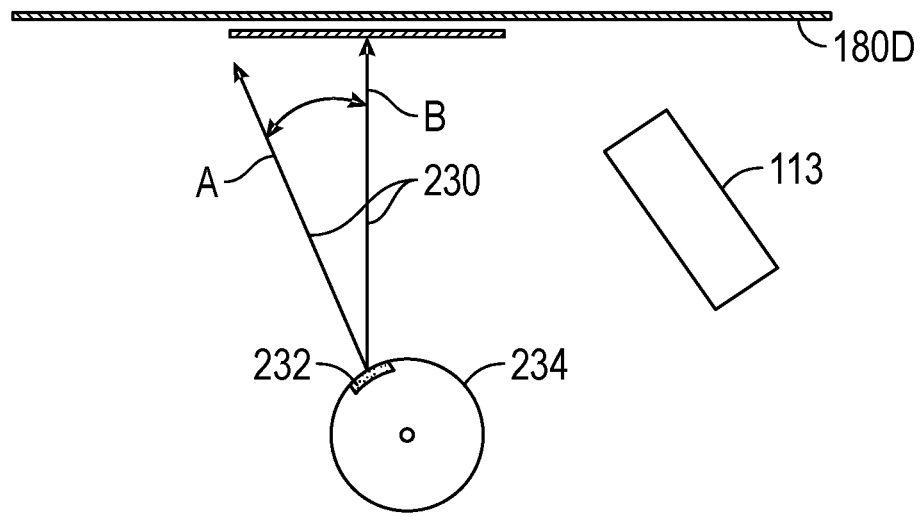
Figure 6:
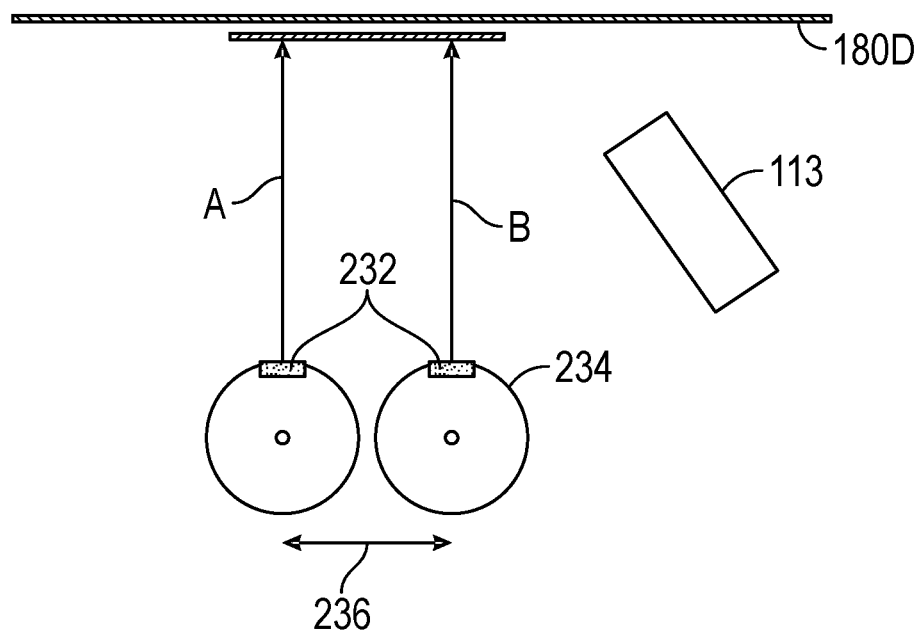
Figure 7:
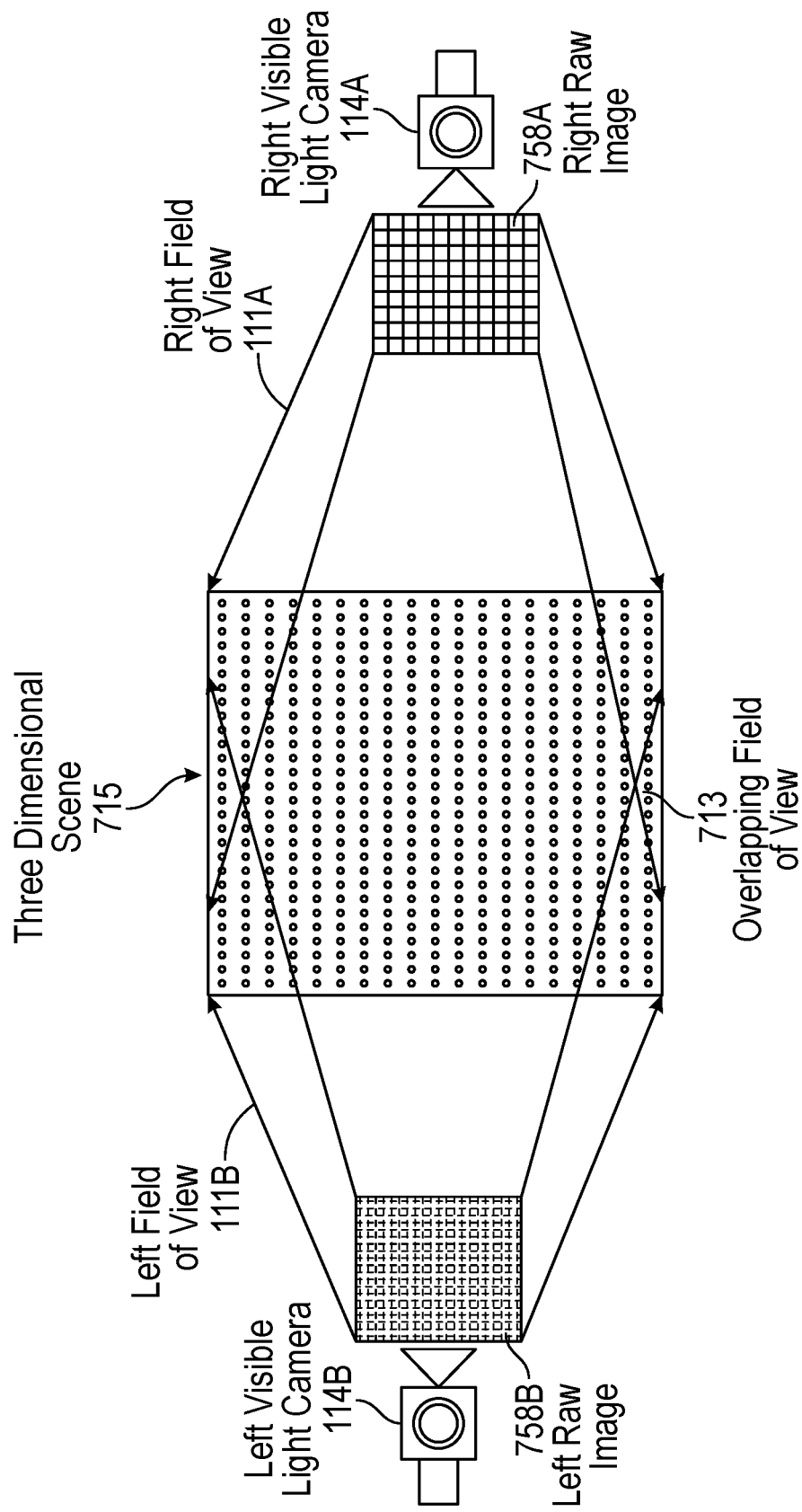
Figure 8A:
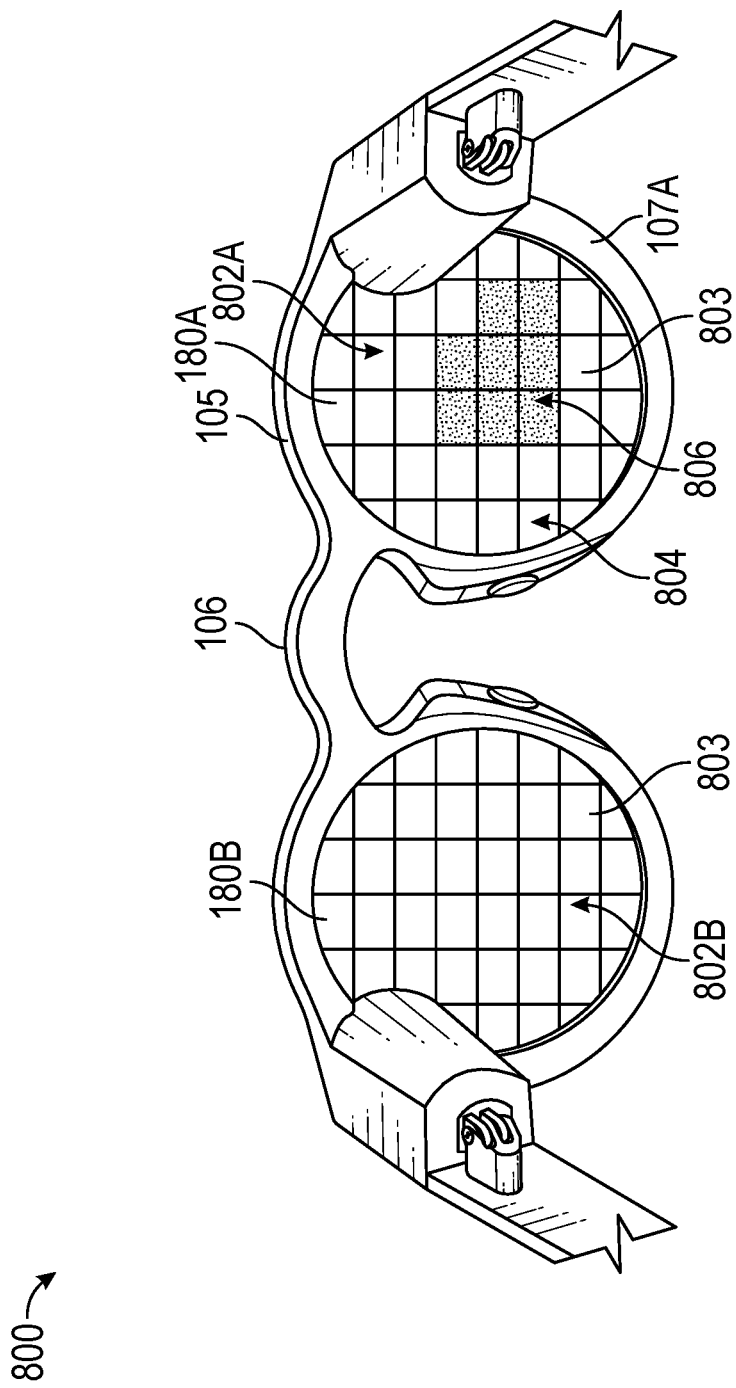
Figure 8B:
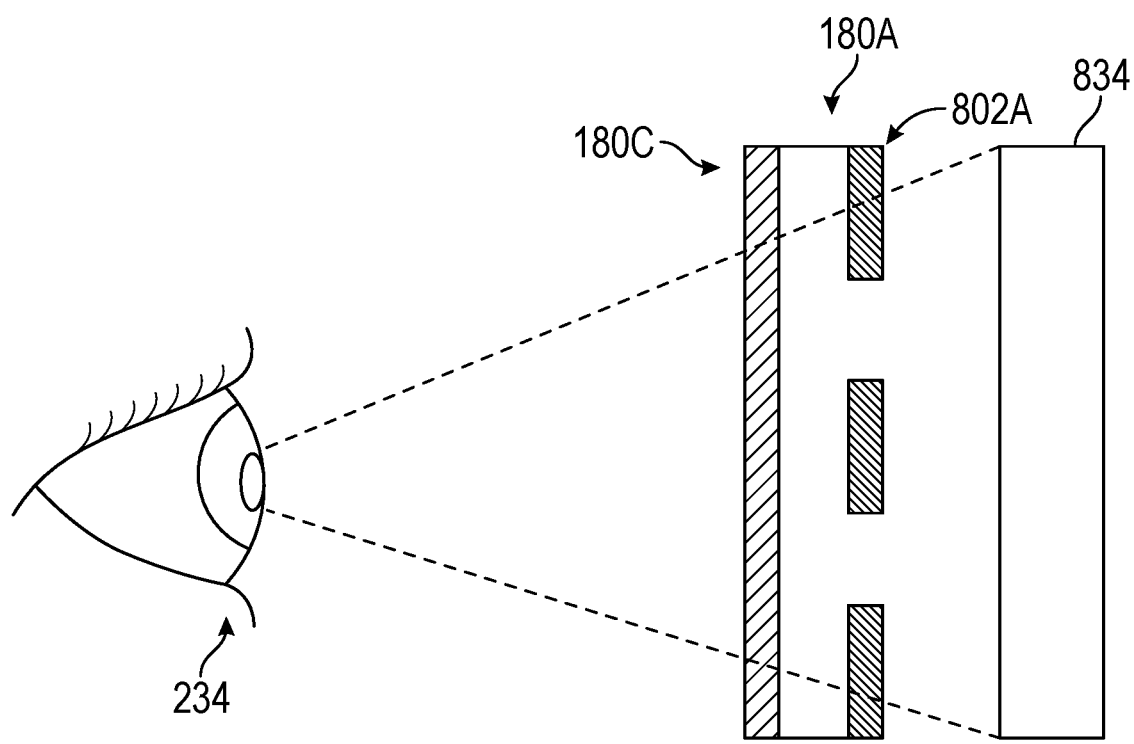
Figure 8C:
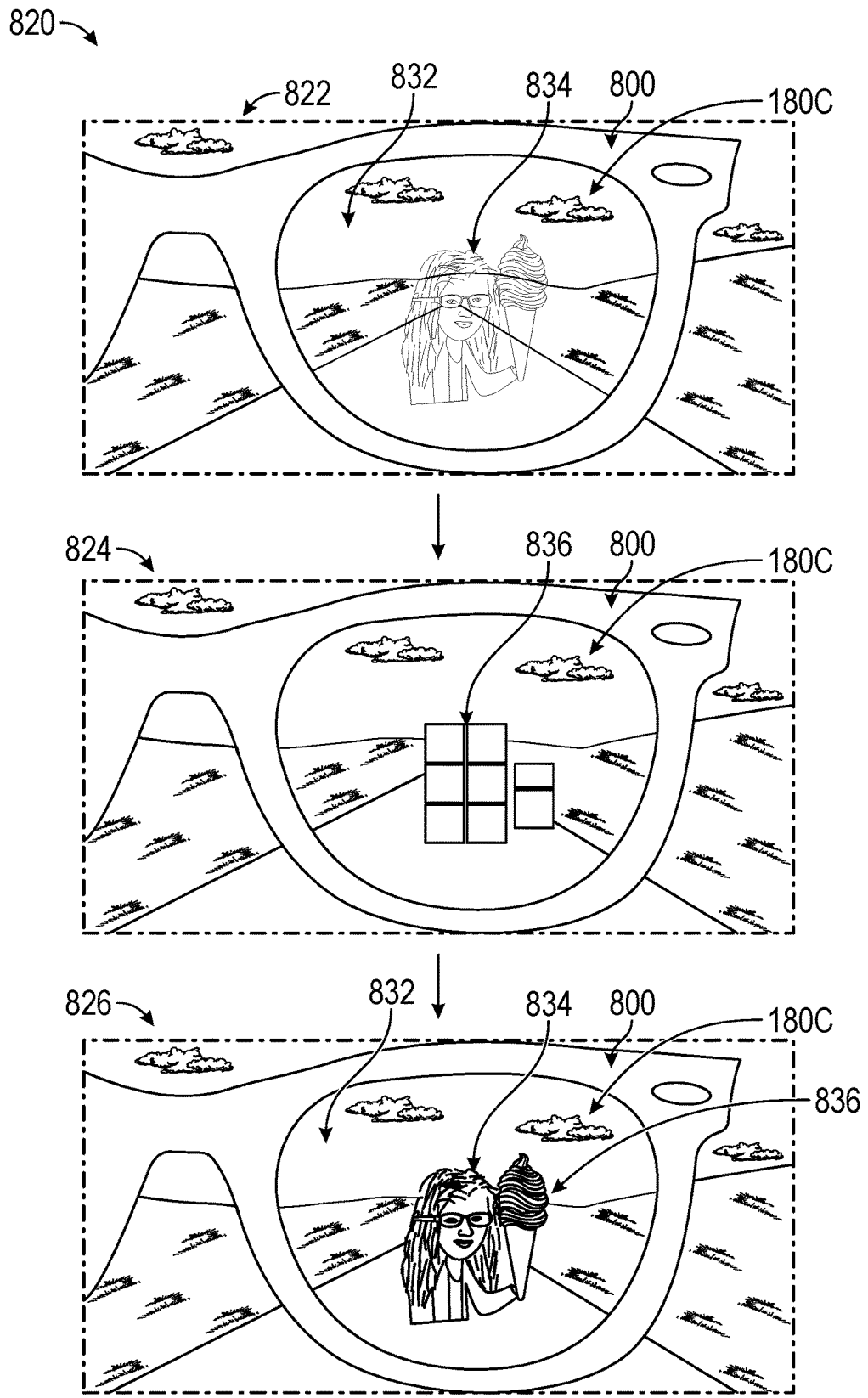
Figure 9:
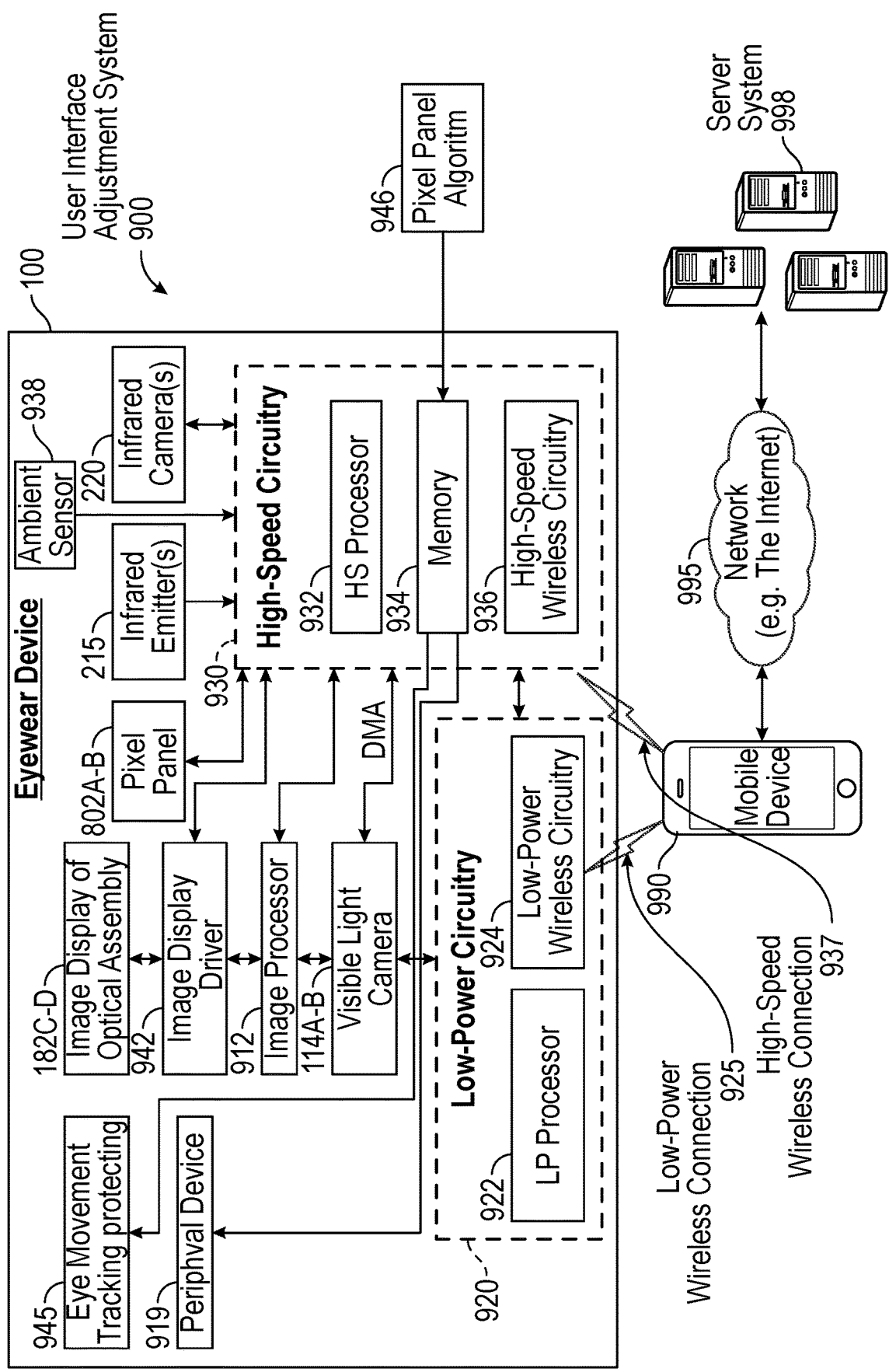
Figure 10A:
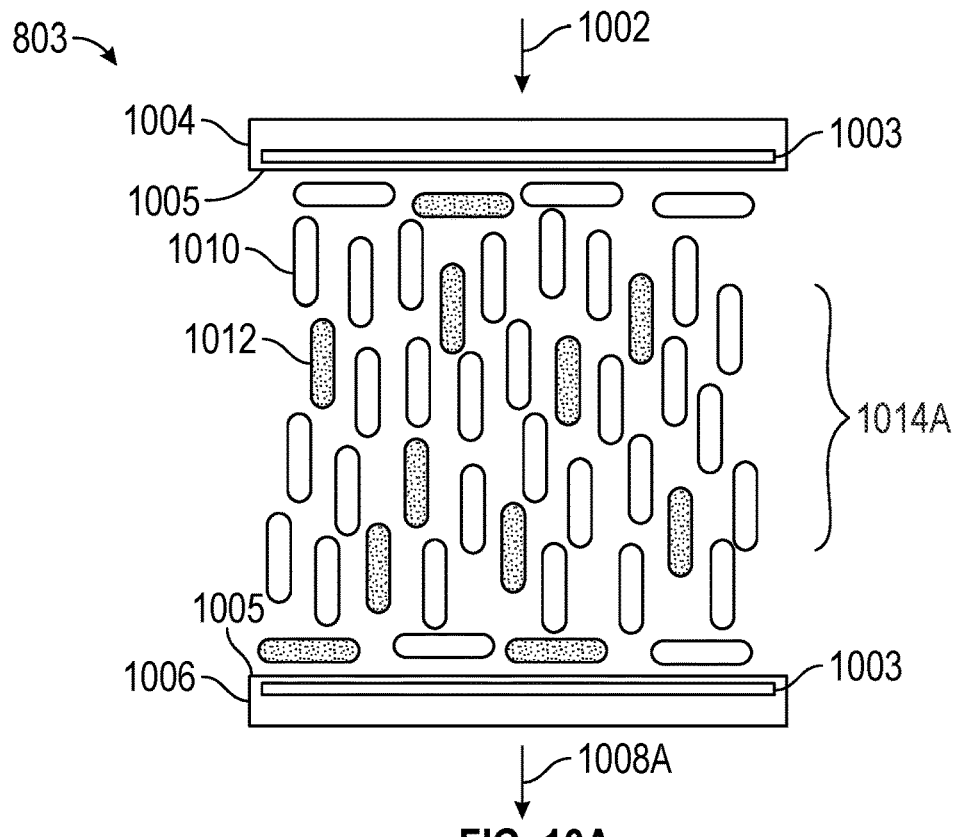
Figure 10B:
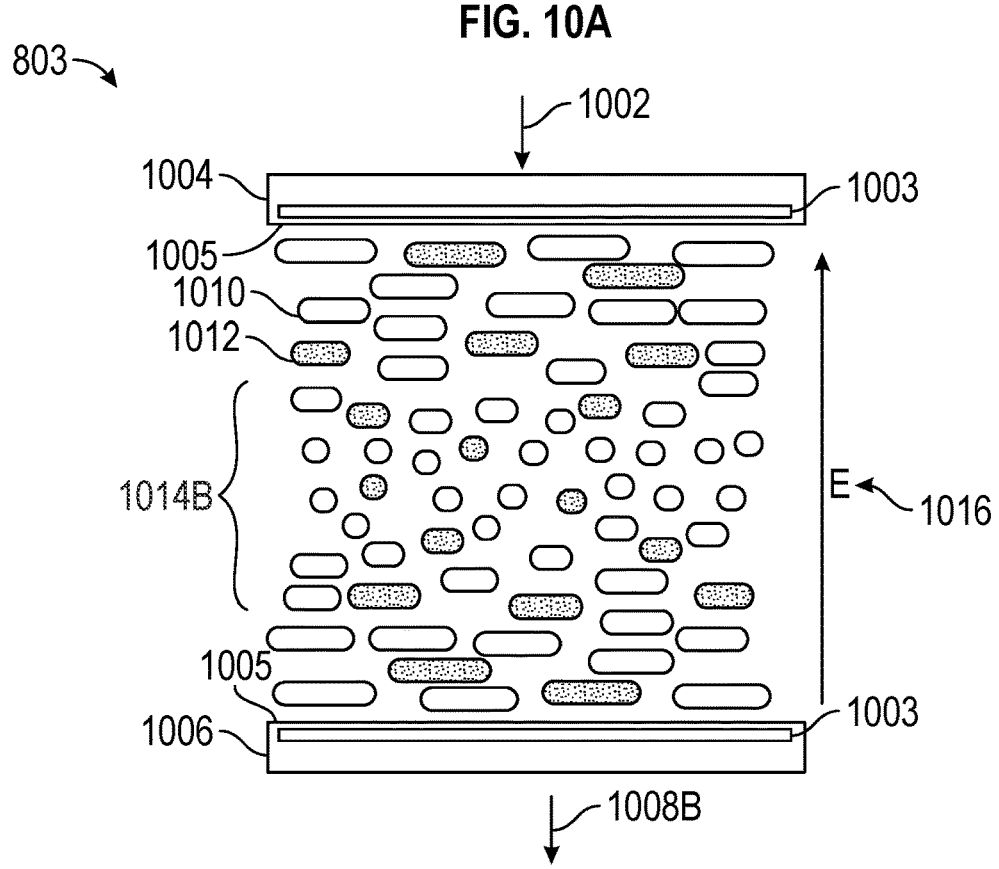
Figure 11:
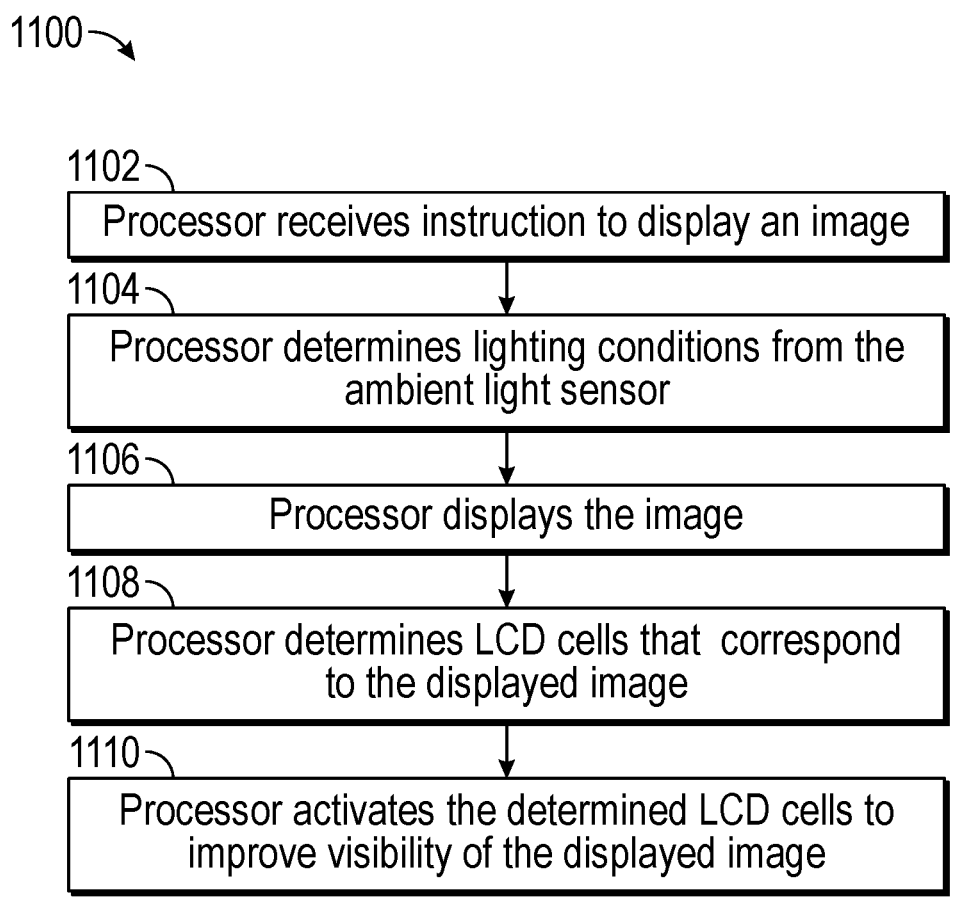

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures:

FIG. 1A is a side view of an example electronic eyewear device including an optical assembly with an image display;

FIG. 1B is a top cross-sectional view of optical components and electronics in a portion of the electronic eyewear device illustrated in FIG. 1A;

FIG. 2A is a rear view of an example electronic eyewear device;

FIG. 2B is a rear view of an example electronic eyewear device;

FIG. 2C is a rear view of an example electronic eyewear device depicting an image display;

FIG. 2D is a rear view of an example electronic eyewear device depicting an image display;

FIG. 3 is a cross-sectional rear perspective view of the electronic eyewear device of FIG. 2A depicting an infrared emitter, an infrared camera, a frame front, a frame back, and a circuit board;

FIG. 4 is a cross-sectional view through the infrared emitter and the frame of the electronic eyewear device of FIG. 3;

FIG. 5 is a top view illustrating detection of eye gaze direction;

FIG. 6 is a top view illustrating detection of eye position;

FIG. 7 is a block diagram depicting capture of visible light by visible light cameras;

FIG. 8A is a rear view of an example electronic eyewear device with a spatial dimming pixel panel;

FIG. 8B is a side cross-sectional view of a spatial dimming pixel panel illustrating the orientation of a display and the spatial dimming pixel panel in an optical assembly with reference to a user's eye;

FIG. 8C is an image series illustrates using spatial dimming with augmented reality;

FIG. 9 is a block diagram of electronic components of the electronic eyewear device including a frame supporting an optical assembly, where the optical assembly includes a spatial dimming pixel panel coupled to a display;

FIG. 10A is a cross-sectional partial view of an LCD cell within the spatial dimming pixel panel illustrating an inactive state;

FIG. 10B is a cross-sectional partial view of an LCD cell within the pixel panel illustrating an active state; and FIG. 11 is a flow chart of step for using spatial dimming LCDs in eyewear for augmented reality.

DETAILED DESCRIPTION

An electronic eyewear device having an optical assembly including a display that displays an image for viewing by a user. The optical assembly includes a spatial dimming pixel panel that delivers improved backlighting conditions for displayed images. The spatial dimming pixel panel is spatially dimmed where an image is displayed on a display, and the unoccupied area of the display without a displayed image is not dimmed (undimmed). The real-world view of the user is unaltered in areas where the dimmer is not dimmed, and is altered in areas where it is dimmed. The spatial dimming pixel panel can be made of multiple liquid crystal displays (LCDs) or of a single liquid crystal display with cells arranged in a gridded orientation with a dye-doped or guest-host liquid crystal system having a phase change mode with homeotropic alignment or planar alignment. This pixel panel absorbs nonpolarized light when a voltage is applied across the LCD cells and passes nonpolarized light in the absence of a voltage across the LCD cells.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples to provide a thorough understanding of the relevant teachings. However, it should be apparent to those skilled in the art that the present teachings may be practiced without such details. In other instances, well known methods, procedures, components, and circuitry have been described at a relatively high-level, without detail, to avoid unnecessarily obscuring aspects of the present teachings.

The term "coupled" as used herein refers to any logical, optical, physical, or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

FIG. 1A is an illustration depicting a side view of an example hardware configuration of an electronic eyewear device 100 including an optical assembly 180A with an image display 180C (FIG. 2A). Electronic eyewear device 100 includes multiple visible light cameras 114A and 114B (FIG. 3) that form a stereo camera, of which the first visible light camera 114A is located on a right temple 110A and the second visible light camera 114B is located on a left temple 110B (FIG. 2A). In the illustrated example, the optical assembly 180A is located on the right side of the electronic eyewear device 100. The optical assembly 180A can be located on the left side or other locations of the electronic eyewear devices 100.

The visible light cameras 114A and 114B may include an image sensor that is sensitive to the visible light range wavelength. Each of the visible light cameras 114A and 114B has a different frontward facing angle of coverage, for example, visible light camera 114A has the depicted angle of coverage 111A (FIG. 3). The angle of coverage is an angle range in which the respective image sensor of the visible light cameras 114A and 114B detects incoming light and generates image data. Examples of such visible lights cameras 114A and 114B include a high-resolution complementary metal-oxide-semiconductor (CMOS) image sensor and a video graphic array (VGA) camera, such as 640p (e.g., 640×480 pixels for a total of 0.3 megapixels), 720p, 1080p, 4K, or 8K. Image sensor data from the visible light cameras 114A and 114B may be captured along with geolocation data, digitized by an image processor, and stored in a memory.

To provide stereoscopic vision, visible light cameras 114A and 114B may be coupled to an image processor (element 912 of FIG. 9) for digital processing and adding a timestamp corresponding to the scene in which the image is captured. Image processor 912 may include circuitry to receive signals from the visible light cameras 114A and 114B and to process those signals from the visible light cameras 114A and 114B into a format suitable for storage in the memory (element 934 of FIG. 9). The timestamp may be added by the image processor 912 or other processor that controls operation of the visible light cameras 114A and 114B. Visible light cameras 114A and 114B allow the stereo camera to simulate human binocular vision. Stereo cameras also provide the ability to reproduce three-dimensional images of a three-dimensional scene (scene 715 of FIG. 3) based on two captured images (image pairs 758A and 758B of FIG. 3) from the visible light cameras 114A and 114B, respectively, having the same timestamp. Such three-dimensional images allow for an immersive virtual experience that feels realistic, e.g., for virtual reality or video gaming. For stereoscopic vision, the pair of images 758A and 758B may be generated at a given moment in time—one image for each of the visible light cameras 114A and 114B. When the pair of generated images 758A and 758B from the frontward facing field of view (FOV) 111A and 111B of the visible light cameras 114A and 114B are stitched together (e.g., by the image processor 912), depth perception is provided by the optical assemblies 180A and 180B.

In an example, the electronic eyewear device 100 includes a frame 105, a right rim 107A, a right temple 110A extending from a right lateral side 170A of the frame 105, and a see-through image display 180C (FIGS. 2A-B) comprising optical assembly 180A to present a GUI or other image to a user. The electronic eyewear device 100 includes the first visible light camera 114A connected to the frame 105 or the right temple 110A to capture a first image of the scene. Electronic eyewear device 100 further includes the second visible light camera 114B connected to the frame 105 or the left temple 110B to capture (e.g., simultaneously with the first visible light camera 114A) a second image of the scene which at least partially overlaps the first image. Although not shown in FIGS. 1A and 1B, a high speed (HS) processor 932 (FIG. 9) is coupled to the electronic eyewear device 100 and is connected to the visible light cameras 114A and 114B and memory 934 (FIG. 9) accessible to the processor 932, and programming in the memory 934 may be provided in the electronic eyewear device 100 itself.

Although not shown in FIG. 1A, the electronic eyewear device 100 also may include a head movement tracker (element 109 of FIG. 1B) or an eye movement tracker (element 113 of FIG. 2A or element 213 of FIGS. 2B and 2C). Electronic eyewear device 100 may further include the see-through image displays 180C and D of optical assemblies 180A and 180B, respectively, for presenting a sequence of displayed images. The electronic eyewear devices 100 may further include an image display driver (element 942 of FIG. 9) coupled to the see-through image displays 180C and 180D to drive the image displays 180C and 180D. The see-through image displays 180C and 180D and the image display driver are described in further detail below. Electronic eyewear device 100 may further include the memory 934 and the processor 932 (FIG. 4) having access to the image display driver 942 and the memory 934, as well as programming in the memory 934. Execution of the programming by the processor 932 configures the electronic eyewear device 100 to perform functions, including functions to present, via the see-through image displays 180C and 180D, an initial displayed image of the sequence of displayed images, the initial displayed image having an initial field of view corresponding to an initial head direction or an initial eye gaze direction as determined by the eye movement tracker 113 or 213.

Execution of the programming by the processor 932 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIGS. 2B and 2C), an eye movement of an eye of the user of the electronic eyewear device 100. Execution of the programming by the processor 932 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 932 may further configure the electronic eyewear device 100 to generate successive displayed images of the sequence of displayed images based on the field of view adjustment. Execution of the programming by the processor 932 may further configure the electronic eyewear device 100 to present, via the see-through image displays 180C and 180D of the optical assemblies 180A and 180B, the successive displayed images.

FIG. 1B is an illustration depicting a top cross-sectional view of optical components and electronics in a portion of the electronic eyewear device 100 illustrated in FIG. 1A depicting the first visible light camera 114A, a head movement tracker 109, and a circuit board 140. Construction and placement of the second visible light camera 114B is substantially similar to the first visible light camera 114A, except the connections and coupling are on the other lateral side 170B (FIG. 2A). As shown, the electronic eyewear device 100 includes the first visible light camera 114A and a circuit board, which may be a flexible printed circuit board (PCB) 140. A first hinge 126A connects the right temple 110A to a hinged arm 125A of the electronic eyewear device 100. In some examples, components of the first visible light camera 114A, the flexible PCB 140, or other electrical connectors or contacts may be located on the right temple 110A or the first hinge 126A.

Also shown in FIG. 1B is an electrically conductive shield can 142 coupled to, and disposed between, a RF ground plate 144 and the PCB 140. The shield can 142 has a cavity that encompasses RF electronic components, such as low-power wireless circuitry 924 and high-speed wireless circuitry 936 (FIG. 9), and it provides an RF ground to the RF electrical components. The shield can 142 provides an RF shield to prevent spurious RF signals from emitting outside of the shield can. The shield can 142 also provides a ground for safety and electro-static discharge protection and can form as part of an antenna design. The ground plate 144 may be planar, but it can also be non-planar if desired.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyroscope, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the user's head. The head movement includes a variation of head direction on a horizontal axis, a vertical axis, or a combination thereof from the initial head direction during presentation of the initial displayed image on the image display. In one example, tracking, via the head movement tracker 109, the head movement of the user's head includes measuring, via the inertial measurement unit, the initial head direction on the horizontal axis (e.g., X axis), the vertical axis (e.g., Y axis), or the combination thereof (e.g., transverse or diagonal movement). Tracking, via the head movement tracker 109, the head movement of the user's head further includes measuring, via the inertial measurement unit, a successive head direction on the horizontal axis, the vertical axis, or the combination thereof during presentation of the initial displayed image.

Tracking, via the head movement tracker 109, the head movement of the user's head may include determining the variation of head direction based on both the initial head direction and the successive head direction. Detecting movement of the user of the electronic eyewear device 100 may further include in response to tracking, via the head movement tracker 109, the head movement of the user's head, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110A includes temple body 211 that is configured to receive a temple cap, with the temple cap omitted in the cross-section of FIG. 1B. Disposed inside the right temple 110A are various interconnected circuit boards, such as PCBs or flexible PCBs 140A, that include controller circuits for first visible light camera 114A, microphone(s) 130, speaker(s) 132, low-power wireless circuitry (e.g., for wireless short-range network communication via BLUETOOTH®), and high-speed wireless circuitry (e.g., for wireless local area network communication via WI-FI® and positioning via GPS).

The first visible light camera 114A is coupled to or disposed on the flexible PCB 140A and covered by a visible light camera cover lens, which is aimed through opening(s) formed in the right temple 110A. In some examples, the frame 105 connected to the right temple 110A includes the opening(s) for the visible light camera cover lens. The frame 105 may include a front-facing side configured to face outwards away from the eye of the user. The opening for the visible light camera cover lens may be formed on and through the front-facing side. In the example, the first visible light camera 114A has an outward facing angle of coverage 111A with a line of sight or perspective of the right eye of the user of the electronic eyewear device 100. The visible light camera cover lens also can be adhered to an outward facing surface of the right temple 110A in which an opening is formed with an outward facing angle of coverage, but in a different outwards direction. The coupling can also be indirect via intervening components.

The first visible light camera 114A may be connected to the first see-through image display 180C of the first optical assembly 180A to generate a first background scene of a first successive displayed image. The second visible light camera 114B may be connected to the second see-through image display 180D of the second optical assembly 180B to generate a second background scene of a second successive displayed image. The first background scene and the second background scene may partially overlap to present a three-dimensional observable area of the successive displayed image.

Flexible PCB 140A may be disposed inside the right temple 110A and coupled to one or more other components housed in the right temple 110A. Although shown as being formed on the circuit boards 140A of the right temple 110A, the first visible light camera 114A can be formed on another circuit board (not shown) in one of the left temple 110B, the hinged arm 125A, the hinged arm 125B, or the frame 105.

FIG. 2A is an illustration depicting a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the right rim 107A connected to the left rim 107B via the bridge 106, which is configured to receive a nose of the user. The right and left rims 107A and 107B include respective apertures 175A and 175B, which hold the respective optical elements 180A and 180B, such as a lens and the see-through displays 180C and 180D. As used herein, the term lens is meant to cover transparent or translucent pieces of glass or plastic having curved and flat surfaces that cause light to converge/diverge or that cause little or no convergence/divergence.

Although shown as having two optical elements 180A and 180B, the electronic eyewear device 100 can include other arrangements, such as a single optical element depending on the application or intended user of the electronic eyewear device 100. As further shown, electronic eyewear device 100 includes the right temple 110A adjacent the right lateral side 170A of the frame 105 and the left temple 110B adjacent the left lateral side 170B of the frame 105. The temples 110A and 110B may be integrated into the frame 105 on the respective sides 170A and 170B (as illustrated) or implemented as separate components attached to the frame 105 on the respective sides 170A and 170B. Alternatively, the temples 110A and 110B may be integrated into hinged arms 125A and 125B attached to the frame 105.

In the example of FIG. 2A, an eye scanner 113 is provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107B. The frame 105 or one or more of the temples 110A and 110B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107A, or in different locations on the frame 105. For example, the infrared emitter 115 may be on the left rim 107B and the infrared camera 120 may be on the right rim 107A. In another example, the infrared emitter 115 may be on the frame 105 and the infrared camera 120 may be on one of the temples 110A or 110B, or vice versa. The infrared emitter 115 can be connected essentially anywhere on the frame 105, right temple 110A, or left temple 110B to emit a pattern of infrared light. Similarly, the infrared camera 120 can be connected essentially anywhere on the frame 105, right temple 110A, or left temple 110B to capture at least one reflection variation in the emitted pattern of infrared light.

The infrared emitter 115 and infrared camera 120 may be arranged to face inwards towards an eye of the user with a partial or full field of view of the eye to identify the respective eye position and gaze direction. For example, the infrared emitter 115 and infrared camera 120 may be positioned directly in front of the eye, in the upper part of the frame 105 or in the temples 110A or 110B at either ends of the frame 105.

FIG. 2B is an illustration depicting a rear view of an example hardware configuration of another electronic eyewear device 200. In this example configuration, the electronic eyewear device 200 is depicted as including an eye scanner 213 on a right temple 210A. As shown, an infrared emitter 215 and an infrared camera 220 are co-located on the right temple 210A. The eye scanner 213 or one or more components of the eye scanner 213 can be located on the left temple 210B and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a right rim 107A which is connected to a left rim 107B via a bridge 106. The rims 107A-B may include respective apertures which hold the respective optical elements 180A and 180B comprising the see-through displays 180C and 180D.

FIG. 2C and FIG. 2D are illustrations depicting rear views of example hardware configurations of the electronic eyewear device 100, including two different types of see-through image displays 180C and 180D. In one example, these see-through image displays 180C and 180D of optical assemblies 180A and 180B include an integrated image display. As shown in FIG. 2C, the optical assemblies 180A and 180B include a display matrix 180C and 180D of any suitable type, such as a liquid crystal display (LCD), an organic light-emitting diode (OLED) display, a waveguide display, or any other such display.

The optical assemblies 180A and 180B also includes an optical layer or layers 176A-N, which can include lenses, optical coatings, prisms, mirrors, waveguides, optical strips, and other optical components in any combination. The optical layers 176 can include a prism having a suitable size and configuration and including a first surface for receiving light from display matrix and a second surface for emitting light to the eye of the user. The prism of the optical layers 176 may extend over all or at least a portion of the respective apertures 175A and 175B formed in the rims 107A and 107B to permit the user to see the second surface of the prism when the eye of the user is viewing through the corresponding rims 107A and 107B. The first surface of the prism of the optical layers 176 faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176. In this regard, the second surface of the prism of the optical layers 176 can be convex to direct the light towards the center of the eye. The prism can be sized and shaped to magnify the image projected by the see-through image displays 180C and 180D, and the light travels through the prism so that the image viewed from the second surface is larger in one or more dimensions than the image emitted from the see-through image displays 180C and 180D.

In another example, the see-through image displays 180C and 180D of optical assemblies 180A and 180B may include a projection image display as shown in FIG. 2D. The optical assemblies 180A and 180B include a projector 150, which may be a three-color projector using a scanning mirror, a galvanometer, a laser projector, or other types of projectors. During operation, an optical source such as a projector 150 is disposed in or on one of the temples 110A or 110B of the electronic eyewear device 100. Optical assemblies 180A and 180B may include one or more optical strips 155A-N spaced apart across the width of the lens of the optical assemblies 180A and 180B or across a depth of the lens between the front surface and the rear surface of the lens.

As the photons projected by the projector 150 travel across the lens of the optical assemblies 180A and 180B, the photons encounter the optical strips 155. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls the optical strips 155 by initiating mechanical, acoustic, or electromagnetic signals. Although shown as having two optical assemblies 180A and 180B, the electronic eyewear device 100 can include other arrangements, such as a single or three optical assemblies, or the optical assemblies 180A and 180B may have different arrangements depending on the application or intended user of the electronic eyewear device 100.

As further shown in FIG. 2C and FIG. 2D, electronic eyewear device 100 includes a right temple 110A adjacent the right lateral side 170A of the frame 105 and a left temple 110B adjacent the left lateral side 170B of the frame 105. The temples 110A and 110B may be integrated into the frame 105 on the respective lateral sides 170A and 170B (as illustrated) or implemented as separate components attached to the frame 105 on the respective sides 170A and 170B. Alternatively, the temples 110A and 110B may be integrated into the hinged arms 125A and 125B attached to the frame 105.

In one example, the see-through image displays include the first see-through image display 180C and the second see-through image display 180D. Electronic eyewear device 100 may include first and second apertures 175A and 175B that hold the respective first and second optical assemblies 180A and 180B. The first optical assembly 180A may include the first see-through image display 180C (e.g., a display matrix, or optical strips and a projector in the right temple 110A). The second optical assembly 180B may include the second see-through image display 180D (e.g., a display matrix, or optical strips and a projector (shown as projector 150) in right temple 110A). The successive field of view of the successive displayed image may include an angle of view between about 15° to 30°, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the image displays 180C and 180D of optical assemblies 180A and 180B. The "angle of coverage" describes the angle range that a lens of visible light cameras 114A or 114B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the image displays 180C and 180D of the optical assemblies 180A and 180B. Image display 180C of optical assemblies 180A and 180B can have a field of view with an angle of coverage between 15° to 30°, for example 24°, and have a resolution of 480×480 pixels (or greater; e.g., 720p, 1080p, 4K, or 8K).

FIG. 3 shows a cross-sectional rear perspective view of the electronic eyewear device of FIG. 2A. The electronic eyewear device 100 includes the infrared emitter 115, infrared camera 120, a frame front 330, a frame back 335, and a circuit board 340. It can be seen in FIG. 3 that the upper portion of the left rim of the frame of the electronic eyewear device 100 includes the frame front 330 and the frame back 335. An opening for the infrared emitter 115 is formed on the frame back 335.

As shown in the encircled cross-section 4 in the upper middle portion of the left rim of the frame, a circuit board, which is a flexible PCB 340, is sandwiched between the frame front 330 and the frame back 335. Also shown in further detail is the attachment of the left temple 110B to the left temple 125B via the left hinge 126B. In some examples, components of the eye movement tracker 113, including the infrared emitter 115, the flexible PCB 340, or other electrical connectors or contacts may be located on the left temple 125B or the left hinge 126B.

FIG. 4 is a cross-sectional view through the infrared emitter 115 and the frame corresponding to the encircled cross-section 4 of the electronic eyewear device of FIG. 3. Multiple layers of the electronic eyewear device 100 are illustrated in the cross-section of FIG. 4, as shown the frame includes the frame front 330 and the frame back 335. The flexible PCB 340 is disposed on the frame front 330 and connected to the frame back 335. The infrared emitter 115 is disposed on the flexible PCB 340 and covered by an infrared emitter cover lens 445. For example, the infrared emitter 115 is reflowed to the back of the flexible PCB 340. Reflowing attaches the infrared emitter 115 to contact pad(s) formed on the back of the flexible PCB 340 by subjecting the flexible PCB 340 to controlled heat which melts a solder paste to connect the two components. In one example, reflowing is used to surface mount the infrared emitter 115 on the flexible PCB 340 and electrically connect the two components. However, it should be understood that through-holes can be used to connect leads from the infrared emitter 115 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

In an example, the processor 932 utilizes eye tracker 113 to determine an eye gaze direction 230 of a wearer's eye 234 as shown in FIG. 5, and an eye position 236 of the wearer's eye 234 within an eyebox as shown in FIG. 6. The eye tracker 113 is a scanner which uses infrared light illumination (e.g., near-infrared, short-wavelength infrared, mid-wavelength infrared, long-wavelength infrared, or far infrared) to captured image of reflection variations of infrared light from the eye 234 to determine the gaze direction 230 of a pupil 232 of the eye 234, and also the eye position 236 with respect to a see-through display 180.

The block diagram in FIG. 7 illustrates an example of capturing visible light with cameras 114A and 114B. Visible light is captured by the first visible light camera 114A with a round field of view (FOV) 111A. A chosen rectangular first raw image 758A is used for image processing by image processor 912 (FIG. 9). Visible light is also captured by the second visible light camera 114B with a round FOV 111B. A rectangular second raw image 758B chosen by the image processor 912 is used for image processing by processor 912. The raw images 758A and 758B have an overlapping field of view 713. The processor 912 processes the raw images 758A and 758B and generates a three-dimensional image 715 for display by the displays 180.

FIG. 8A illustrates a rear view of an example hardware configuration of an electronic eyewear device 800. In this example configuration, the optical assemblies 180A-B include spatial dimming pixel panels 802A-B that are coupled to the respective displays 180C-D. The spatial dimming pixel panels 802A-B each include an array of liquid crystal display (LCD) cells 803, referred to as pixels, arranged in a gridded pattern. In an example, each spatial dimming pixel panel 802A-B contains 45 LCD cells that are configured to selectively absorb impinging non-polarized light when activated. Other examples may have more or less pixels to accommodate for particular applications.

The spatial dimming pixel panels 802A-B cover the respective display area 180C-D to selectively reduce the brightness of the background behind an image viewed by a user's eye. The spatial dimming pixel panels 802A-B provide spatial dimming of the respective displays 180C-D by selectively activating pixels 803 that are in the background behind the image displayed. The pixels 803 of the spatial dimming pixel panels 802A-B have an inactive state 804 where light transmission of the dimming pixel is high and unaltered, and an active state 806 where the light transmission of the dimming pixel is altered to be lower than the inactive state 804. In one example, the light transmission of the active state 806 is 50% less than the light transmission of the inactive state 804, and vice versa for active and inactive state dimming.

FIG. 8B is a cross-sectional view of the optical assembly 180A with reference to the user's eye 234. The display 180C is on the side of the spatial dimming pixel panel 802A closest to the user's eye 234. This orientation allows the spatial dimming pixel panel 802A to reduce the transmittance of real-world view 832 (FIG. 8C) through the optical assembly 180A proximate the displayed virtual image 834 without affecting the transmittance of the displayed virtual image by the display 180C to the user. The individual pixels 803 of the spatial dimming pixel panel 802A are controlled based on the spatial/angular location of the virtual image 834 in the field of view. Each pixel 803 of the spatial dimming pixel panel 802A is controlled by the processor 932 (FIG. 9). Pixels 803 that are adjacent a portion of the displayed virtual image 834 are dimmed, and the pixels 803 that are not adjacent a portion of the displayed image are not dimmed. In one example, the processor 932 controls individual pixels 803, where the pixels 803 are each a transistor that operates as a light valve, such as a LCD cell. Each pixel 803 is controlled individually by controlling the respective transistor. In one example, the display 180C is a waveguide that presents virtual content to the user. The dimming of the individual pixels 803 is also a function of the ambient light detected by an ambient light sensor 938, such that the pixel dimming is increased in higher ambient light conditions. The optical assembly 180B may have similar construction as the optical assembly 180A, where each pixel of the display 180C-D and each pixel 803 comprise an LCD cell.

FIG. 8C is an image series 820 depicting the electronic eyewear device 800 including the spatial dimming pixel panel 802A implementing a pixel panel algorithm 946 (shown in FIG. 9) for displaying an image with spatial dimming to improve the visibility of a displayed image 834 in a bright lighting condition. The processor 932 actively manages a transparency of portions of the spatial dimming pixel panel 802A as a function of the ambient brightness detected by ambient light sensor 938 to maintain a desired level of 'content solidity,' referred to as spatial dimming. Spatial dimming is the selective reduction of light transmittance for a specific portion of the display 180C-D, as compared to global dimming where the light transmittance of the entire display 180C-D is reduced.

Image 822 illustrates the electronic eyewear device 800 displaying the image 834 having a washed-out state on the display 180C with the spatial dimming pixel panel 802A in an inactive state as viewed by the eyewear user. The displayed image 834 in the washed-out state is due to the brightness of the real-world view 832. This brightness reduces the visibility of the displayed image 834 to a user. In the inactive state, the real-world view 832 behind the image 834 is viewed through the display 180C unaltered.

Image 824 illustrates the electronic eyewear device 800 activating pixels 836 of the spatial dimming pixel panel 802B without the presence of the image 834. The pixels 803 that are selectively activated by the processor 932 correspond to the area of the display 180C that the displayed image 834 occupies. The processor 932 knows which pixels of the display 180C are used to display the displayed image 834. The activated pixels 836 reduce the transmittance of the real-world view 832 through the display 180C. The pixels 803 of the spatial dimming pixel panel 802A that do not correspond to the area of the display 180C that the displayed image 834 occupies are inactive, as known to the processor 932, allowing for high transmittance of the real-world view 832 in area(s) not corresponding to the displayed image.

Image 826 illustrates the electronic eyewear device 800 displaying image 834 adjacent the activated pixels 836. The activated pixels 836 reduce the light transmittance of the real-world view through the display 180C where the virtual image 834 is displayed to improve the visibility of the displayed image 834 to a user. In normal operation of the electronic eyewear device 800, the displayed image 834 and the activated pixels 836 are displayed simultaneously by the processor 932. Pixels 803 are additionally activated and deactivated during operation to compensate for changes in the area of the displayed image 834 by the display 180C-D. In one example, multiple pixels 803 are activated and deactivated while a video is displayed on the displays 180C-D. The spatial dimming pixel panel 802A and display 180C are configured to operate the same as spatial dimming pixel panel 802B and display 180D to operate as a stereoscopic display.

Visibility of the displayed image 834 is affected by a relative brightness between the displayed image 834 and the background directly behind the image, and by an absolute brightness (luminance of the background light). A much brighter background behind the displayed image 834 can make it look transparent or 'see-through' when the brightness of the displayed image 834 is not increased to compensate for the bright background. A relatively darker background behind the displayed image 834 can make it look opaque or 'solid.' A very dim background behind the displayed image 834 can make the displayed image 834 'too solid' and appear 'too real and vivid' if the brightness of the displayed image 834 is not decreased to compensate for the dim background. The processor 932 actively manages the display 180C-D brightness as a function of the ambient brightness by detecting the ambient light using ambient light sensor 938 and via the spatial dimming pixel panel 802A-B to maintain a desired level of 'content solidity.' For example, the dimming pixel panel 802A-B and the brightness of the displayed image 834 are controlled by the processor 932 to maintain a brightness ratio of 1 to 4 ratio between. The brightness ratio is determined by the sum of the background luminance and the displayed image 834 luminance divided by the background luminance. Other luminance ratios may be used to accommodate for a variety of environments.

In another example, the spatial dimming pixel panel 802A-B is controlled globally to produce a dimming effect on the background light passing through the display 180C-D. In one example, this entire spatial dimming pixel panel 802A-B is activated when a user walks from a dimly lit room to a bright outdoor area.

FIG. 9 depicts a high-level functional block diagram including example electronic components disposed in the electronic eyewear device 100/200. The illustrated electronic components include the processor 932, the memory 934, and the see-through image display 180C and 180D.

Memory 934 includes instructions for execution by processor 932 to implement functionality of eyewear 100/200, including instructions for processor 932 to control in the image 715. Processor 932 receives power from battery (not shown) and executes the instructions stored in memory 934, or integrated with the processor 932 on-chip, to perform functionality of eyewear 100/200, and communicating with external devices via wireless connections.

A user interface adjustment system 900 includes a wearable device, which is the electronic eyewear device 100 with an eye movement tracker 213 (e.g., shown as infrared emitter 215 and infrared camera 220 in FIG. 2B). User interface adjustments system 900 also includes a mobile device 990 and a server system 998 connected via various networks. Mobile device 990 may be a smartphone, tablet, laptop computer, access point, or any other such device capable of connecting with electronic eyewear device 100 using both a low-power wireless connection 925 and a high-speed wireless connection 937. Mobile device 990 is connected to server system 998 and network 995. The network 995 may include any combination of wired and wireless connections.

Electronic eyewear device 100 includes at least two visible light cameras 114 (one associated with one side (e.g., the right lateral side 170A) and one associated with the other side (e.g., left lateral side 170B). Electronic eyewear device 100 further includes two see-through image displays 180C-D of the optical assembly 180A-B (one associated with each side). Electronic eyewear device 100 also includes image display driver 942, image processor 912, low-power circuitry 920, and high-speed circuitry 930. The components shown in FIG. 9 for the electronic eyewear device 100/200 are located on one or more circuit boards, for example a PCB or flexible PCB, in the temples 110A-B as previously described. Alternatively, or additionally, the depicted components can be located in the temples, frames, hinges, or bridge of the electronic eyewear device 100. The visible light cameras 114A-B can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 945 implements the user interface field of view adjustment instructions, including, to cause the electronic eyewear device 100 to track, via the eye movement tracker 213, the eye movement of the eye of the user of the electronic eyewear device 100. Other implemented instructions (functions) cause the electronic eyewear device 100 to determine, a field of view adjustment to the initial field of view of an initial displayed image based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 934 to present the sequence of displayed images, including the initial displayed image with the initial field of view and the successive displayed image with the successive field of view.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 to drive the image displays 180C-D of the optical assembly 180A-B to create the virtual image. High-speed processor 932 may be any processor capable of managing high-speed communications and operation of any general computing system needed for electronic eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the electronic eyewear device 100 and the operating system is stored in memory 934 for execution. In addition to any other responsibilities, the high-speed processor 932 executing a software architecture for the electronic eyewear device 100 is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the electronic eyewear device 100 can include short range transceivers (e.g., UWB or Bluetooth™) and wireless wide, local, or wide area network transceivers (e.g., cellular or WiFi) including antennas 808. Mobile device 990, including the transceivers communicating via the low-power wireless connection 925 and high-speed wireless connection 937, may be implemented using details of the architecture of the electronic eyewear device 100, as can other elements of network 995.

Memory 934 includes any storage device capable of storing various data and applications, including, among other things, color maps, camera data generated by the visible light cameras 114A-B and the image processor 912, as well as images generated for display by the image display driver 942 on the see-through image displays 180C-D of the optical assembly 180A-B. While memory 934 is shown as integrated with high-speed circuitry 930, in other examples, memory 934 may be an independent standalone element of the electronic eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that include a processor, a memory, and network communication interface to communicate over the network 995 with the mobile device 990 and electronic eyewear device 100. Electronic eyewear device 100 is connected with a host computer. For example, the electronic eyewear device 100 is paired with the mobile device 990 via the high-speed wireless connection 937 or connected to the server system 998 via the network 995.

Output components of the electronic eyewear device 100 include visual components, such as the image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 942. The output components of the electronic eyewear device 100 further include acoustic components (e.g., speakers), haptic components (e.g., a vibratory motor), other signal generators, and so forth. The input components of the electronic eyewear device 100, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Electronic eyewear device 100 may optionally include additional peripheral device elements 919. Such peripheral device elements may include biometric sensors, additional sensors, or display elements integrated with electronic eyewear device 100. For example, peripheral device elements 919 may include any I/O components including output components, motion components, position components, or any other such elements described herein. The electronic eyewear device 100 can take other forms and may incorporate other types of frameworks, for example, a headgear, a headset, or a helmet.

For example, the biometric components of the user interface field of view adjustment may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some examples, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or other mobile operating systems. In this example, the third-party application can invoke API calls provided by the operating system to facilitate functionality described herein.

FIGS. 10A and 10B are diagrams illustrating an LCD cell 803 of the spatial dimming pixel panel 802A-B. FIG. 10A illustrates the cell 803 in the inactive state where a voltage applied by the electrodes 1003 across the cell 803 is zero. The electrodes 1003 are controlled by the processor 932 to dim the corresponding cell 803. In one example, the cell 803 is a dye-doped or guest-host liquid crystal system used in a phase change mode with homeotropic alignment. The cell 803 is encapsulated by a first end 1004 that allows unpolarized light 1002 generated by the environment about the electronic eyewear device 800 to enter and a second end 1006 that allows transmitted light 1008A of the unpolarized light 1002 to exit the cell. In one example, the first end 1004 and the second end 1006 are made of glass, but other materials with high visible light transmittance, such as plastics, may be used. The first end 1004 and second end 1006 have an inner surface with a coating 1005 that form electrodes 1003 that apply voltage across the cell 803. In one example, the coating 1005 is indium tin oxide (ITO). Liquid crystals 1010 and dichroic dyes 1012 are disposed between the first end 1004 and the second end 1006. In the inactive state, light absorption of the pixel 803 is low and the transmission of light 1008A is high due to the orientation 1014A of the liquid crystals 1010 and dichroic dyes 1012.

FIG. 10B illustrates the cell 803 in the active state when a voltage is applied across the cell creating an electric field 1016. In the active state, absorption of the absorption-based dye-doped liquid crystal system is high and the transmission of light 1008B is low due to the orientation 1014B of the liquid crystals 1010 and dichroic dyes 1012. The liquid crystals 1010 have a negative anisotropy and a chiral twist formed if the voltage is applied to the cell 803 increasing absorbance of the cell 803. The helical distribution of the director orients the absorption axis of the dichroic dyes in such a way that multiple planes of polarization are absorbed for a high absorbance without the use of a polarizer.

The guest host system of the liquid crystal cell 803 does not require the use of polarizers for absorption of light. This results in an overall increase in transmittance of light through the cell 803 since traditional LCD panels only have one component of polarization along one direction resulting in half the intensity of transmitted light. The guest host system additionally reduces the number of layered components needed to construct the cell 803 as compared to traditional LCDs with cross polarizers. An alternative liquid crystal mode is a guest-host twisted nematic mode. In this case, the inactive cell has low transmission due to the twist formed in the liquid crystal orthogonal alignment layers and a low pre-tilt angle at each of the coverglass planes. Chiral dopants can be utilized to create a higher number of twist periods.

Other optional modes of liquid crystal designs that are suitable for dimming in this disclosure include vertical aligned nematic (VAN) mode, electrical control birefringence (ECB) mode, twisted-vertical aligned nematic (T-VAN) mode, twisted-nematic (T-N) mode, and nematic LC w/chiral dopant mode.

FIG. 11 illustrates a method 1100 of presenting virtual images to a user with spatial dimming from the spatial dimming pixel panel 802A-B of the electronic eyewear device 800 using pixel panel algorithm 946.

At block 1102, the processor 932 receives instructions to display a virtual image 834 on the display 180C-D. The instructions may be sent as a result of input from a user, signals from a remote server, a remote device, or other source of input.

At block 1104, the processor 932 determines the lighting conditions of the environment surrounding the electronic eyewear device. The processor 932 may determine the ambient lighting conditions in response to ambient light senses by the ambient light sensor 938. In another example, the processor 932 uses the visible light cameras 114A-B to determine the lighting conditions of the environment around the eyewear device 800.

At block 1106, the processor 932 displays the virtual image 834 on the display 180C-D.

At block 1108, the processor 932 determines the individual pixels 803 of the spatial dimming pixel panel 802A-B that are to be activated. Specific cells 803 of the spatial dimming pixel panel 802A-B correlate to specific pixels of the display 180C-D.

At block 1110, the respective pixels 803 of the spatial dimming pixel panel 802A-B corresponding to the spatial location of the virtual image 834 are activated. The activated pixels 836 dim the background light for the region of the displayed image 834 while allowing the rest of the real-world view to pass through the display unaltered. The activated pixels are dimmed by applying a voltage to the LCD cells of the pixels 803.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device, comprising:
   a display configured to allow viewing of a background through the display;
   a processor configured to process a video including frames having an image and display the processed frames on the display; and
   a spatial dimming pixel panel coupled to the display, wherein the spatial dimming pixel panel is configured to be selectively controlled by the processor to produce a dimmed portion that is less than the entire spatial dimming pixel panel, wherein the spatial dimming pixel panel comprises multiple pixels, wherein the processor is configured to selectively control dimming of the individual pixels that correspond to an area of the display displaying the image, wherein the multiple pixels are activated and deactivated while the video is displayed on the display, wherein the pixels corresponding to the image are dimmed while the pixels corresponding to the background are not dimmed.

2. The electronic eyewear device of claim 1, wherein the electronic eyewear device further comprises an ambient light sensor, wherein the processor is configured to control a transparency of the spatial dimming pixel panel as a function of the ambient light sensor.

3. The electronic eyewear of claim 1, wherein the pixels that do not correspond to the area of the displayed images are undimmed.

4. The electronic eyewear of claim 1, further comprising a frame, and an optical assembly coupled to the frame and the spatial dimming pixel panel.

5. The electronic eyewear device of claim 1, wherein the spatial dimming pixel panel comprises liquid crystal display (LCD) pixels configured to absorb non-polarized light.

6. The electronic eyewear device of claim 5, wherein a transparency of the LCD pixels is reduced by an applied voltage and wherein the LCD pixels have unaltered transparency in the absence of the voltage.

7. The electronic eyewear device of claim 6, wherein the LCD pixels comprise an absorption-based guest-host system.

8. The electronic eyewear device of claim 6, wherein the LCD pixels comprise a dye-doped liquid crystal system.

9. A method of operating an eyewear device having a display configured to allow viewing of a background through the display, a processor configured to process a video including frames having an image and display the processed frames on the display, and a spatial dimming pixel panel coupled to the display, wherein the spatial dimming pixel panel is configured to be selectively controlled by the processor to produce a dimmed portion that is less than the entire spatial dimming pixel panel, wherein the spatial dimming pixel panel comprises multiple pixels, wherein the processor is configured to selectively control dimming of the individual pixels that correspond to an area of the display displaying the image, comprising the steps of:
  displaying the processed frames of the video on the display, wherein the multiple pixels are activated and deactivated while the video is displayed on the display;
  reducing a transparency of the spatial dimming pixel panel at the dimmed portion that corresponds to the displayed image; and
  maintaining the transparency of the spatial dimming pixel panel at an undimmed portion corresponding to the background.

10. The method of claim 9, wherein the eyewear device further comprises an ambient light sensor, wherein the processor controls a transparency of the spatial dimming pixel panel as a function of the ambient light sensor.

11. The method of claim 9, wherein the pixels that do not correspond to the area of the displayed images are undimmed.

12. The method of claim 9, further comprising a frame, and an optical assembly coupled to the frame and the spatial dimming pixel panel.

13. The method of claim 9, wherein the spatial dimming pixel panel comprises liquid crystal display (LCD) pixels configured to absorb non-polarized light.

14. The method of claim 13, wherein a transparency of the LCD pixels is reduced by an applied voltage and wherein the LCD pixels have unaltered transparency in the absence of the voltage.

15. The method of claim 14, wherein the LCD pixels comprise an absorption-based guest-host system.

16. The method of claim 14, wherein the LCD pixels comprise a dye-doped liquid crystal system.

17. A spatial dimming pixel panel configured for use with an electronic eyewear device having a display configured to allow viewing of a background through the display and a processor configured to process a video including frames having an image, wherein the spatial dimming pixel panel is configured to couple to the display, the spatial dimming pixel panel including pixels and circuitry configured to be selectively controlled by the processor to produce a dimmed portion of the pixels that is less than the entire spatial dimming pixel panel, wherein the dimmed portion of pixels has reduced transparency, wherein the spatial dimming pixel panel comprises multiple pixels, wherein the processor is configured to selectively control dimming of the individual pixels that correspond to an area of the display displaying the image, wherein the multiple pixels are activated and deactivated while the video is displayed on the display, wherein the pixels corresponding to the image are dimmed while the pixels corresponding to the background are not dimmed.

18. The spatial dimming pixel panel of claim 17, wherein the electronic eyewear device further comprises an ambient light sensor, wherein the dimmed portion of pixels is configured to have reduced transparency as a function of the ambient light sensor.

* * * * *